(12) United States Patent
Kou et al.

(10) Patent No.: US 12,272,988 B2
(45) Date of Patent: Apr. 8, 2025

(54) CHARGING CONTROL METHOD, SYSTEM, AND STORAGE MEDIUM

(71) Applicant: HUIZHOU ROYPOW TECHNOLOGY CO., LTD, Huizhou (CN)

(72) Inventors: Fangzheng Kou, Huizhou (CN); Yanshen Hu, Huizhou (CN)

(73) Assignee: HUIZHOU ROYPOW TECHNOLOGY CO., LTD, Huizhou (CN)

(*) Notice: Subject to any disclaimer, the term of this patent is extended or adjusted under 35 U.S.C. 154(b) by 71 days.

(21) Appl. No.: 18/095,095

(22) Filed: Jan. 10, 2023

(65) Prior Publication Data
US 2024/0063653 A1     Feb. 22, 2024

(30) Foreign Application Priority Data
Aug. 16, 2022 (CN) .......................... 202210979780.3

(51) Int. Cl.
*H02J 7/16*     (2006.01)
*H01M 10/052*     (2010.01)
(Continued)

(52) U.S. Cl.
CPC .............. *H02J 7/16* (2013.01); *H01M 10/052* (2013.01); *H01M 10/06* (2013.01); *H01M 10/44* (2013.01);
(Continued)

(58) Field of Classification Search
CPC ...... H02J 7/16; H02J 2207/20; H01M 10/052; H01M 10/06; H01M 10/44; H01M 10/46; H01M 2010/4271; H01M 2220/20
(Continued)

(56) References Cited

U.S. PATENT DOCUMENTS 9,059,602 B2 *   6/2015   Tsuchiya .................... H02J 7/16
10,017,138 B2 *   7/2018   Kamioka .............. B60R 16/033
(Continued)

FOREIGN PATENT DOCUMENTS

CN     104868540 A     8/2015
CN     204567338 U     8/2015
(Continued)

OTHER PUBLICATIONS

Chinese Patent Office: Office Action of CN 202210979780.3 (related application); Mar. 3, 2023; 6 pages.

*Primary Examiner* — Alfonso Perez Borroto (57) ABSTRACT

The present disclosure relates to a charging control method, system, device, an on-board charging module and a storage. The charging control method includes: acquiring a working voltage of a voltage converter on a condition that an output voltage of an electric generator is greater than a rated voltage of a battery module, the battery module includes a lead-acid battery and a lithium battery, the rated voltage of the battery module is a sum of a rated voltage of the lead-acid battery and a rated voltage of the lithium battery; determining working parameters of the lead-acid battery according to the working voltage of the voltage converter; and outputting an adjustment signal to the voltage converter according to the working parameters of the lead-acid battery, the adjustment signal is configured to instruct the voltage converter to adjust a voltage output to the lead-acid battery.

15 Claims, 6 Drawing Sheets

(51) Int. Cl.
*H01M 10/06* (2006.01)
*H01M 10/44* (2006.01)
*H01M 10/46* (2006.01)
*B60R 16/033* (2006.01)
*H01M 10/42* (2006.01)

(52) U.S. Cl.
CPC ........... *H01M 10/46* (2013.01); *B60R 16/033* (2013.01); *H01M 2010/4271* (2013.01); *H01M 2220/20* (2013.01); *H02J 2207/20* (2020.01)

(58) Field of Classification Search
USPC .......................................................... 307/9.1
See application file for complete search history.

(56) References Cited

U.S. PATENT DOCUMENTS

| | | | | |
|---|---|---|---|---|
| 10,710,469 | B2* | 7/2020 | Koerner | H02J 7/345 |
| 2011/0127965 | A1* | 6/2011 | Yen | H02J 7/007 |
| | | | | 320/128 |
| 2013/0127247 | A1* | 5/2013 | Oh | B60L 58/20 |
| | | | | 307/10.1 |
| 2014/0176073 | A1* | 6/2014 | Shrinkle | B60L 58/25 |
| | | | | 320/126 |
| 2017/0229884 | A1* | 8/2017 | Tosch | H01M 10/48 |
| 2017/0297440 | A1 | 10/2017 | Hu et al. | |

FOREIGN PATENT DOCUMENTS

| | | |
|---|---|---|
| CN | 205544525 U | 8/2016 |
| CN | 106356575 A | 1/2017 |

\* cited by examiner

FIG. 1

Acquiring a working voltage of a voltage converter on a condition that an output voltage of an electric generator is greater than a rated voltage of a battery module, the battery module including a lead-acid battery and a lithium battery, the rated voltage of the battery module being a sum of a rated voltage of the lead-acid battery and a rated voltage of the lithium battery, the electric generator being connected to the lithium battery, and the voltage converter being connected in series between the electric generator and the lead-acid battery — 202

Determining working parameters of a lead-acid battery according to the working voltage of the voltage converter, the working parameters of the lead-acid battery including a working voltage and a working current of the lead-acid battery — 204

Outputting an adjustment signal to the voltage converter according to the working parameters of the lead-acid battery, the adjustment signal being configured to instruct the voltage converter to adjust a voltage output to the lead-acid battery — 206

CHARGING CONTROL METHOD, SYSTEM, AND STORAGE MEDIUM

CROSS-REFERENCE TO RELATED APPLICATIONS

This application claims priority to Chinese patent application No. 2022109797803 filed with the Chinese Patent Office on Aug. 16, 2022, entitled "CHARGING CONTROL METHOD, SYSTEM, DEVICE, ON-BOARD CHARGE MODULE AND STORAGE MEDIUM", the entire content of which is incorporated by reference.

TECHNICAL FIELD

This disclosure relates to the charging technology, and in particular, to a charging control method, system, and a storage medium.

BACKGROUND

With the development of charging technology, an on-board charging control technology has appeared. At present, the batteries used to supply power to on-board devices are mainly 12V and 24V, and a single battery is generally used as a power supplier for the on-board devices. However, a power storage of the power supplier system with the single battery may lead to a waste of energy.

A dual-battery structure is usually used on current on-board charging system, that is, a lead-acid battery and a lithium battery are used to solve the problem of energy waste. Traditional charging control technology usually performs charging control based on a running state of the vehicle. However, the applicant has found in the implementation that the traditional charging control method still has a problem of low energy utilization.

SUMMARY

In order to solve the above-mentioned problems, the present disclosure provides a charging control method, system, device, an on-board charging module, and a storage medium.

According to a first aspect, the present disclosure provides a charging control method. The method includes: acquiring a working voltage of a voltage converter on a condition that an output voltage of an electric generator is greater than a rated voltage of a battery module, the battery module comprising a lead-acid battery and a lithium battery, the rated voltage of the battery module being a sum of a rated voltage of the lead-acid battery and a rated voltage of the lithium battery, the electric generator being connected to the lithium battery, and the voltage converter being connected in series between the electric generator and the lead-acid battery; determining working parameters of the lead-acid battery according to the working voltage of the voltage converter, the working parameters of the lead-acid battery comprising a working voltage of the lead-acid battery and a working current of the lead-acid battery; and outputting an adjustment signal to the voltage converter according to the working parameters of the lead-acid battery, the adjustment signal being configured to instruct the voltage converter to adjust a voltage output to the lead-acid battery.

According to a second aspect, a charging control system is provided. The charging control system includes: an electric generator configured to connect to an external engine and riven by the external engine; a voltage converter, an input end of the voltage converter is connected to an output end of the electric generator; a lead-acid battery, an input end of the lead-acid battery is connected to an output end of the voltage converter; a lithium battery, an input end of the lithium battery is connected to the output end of the electric generator; and a battery management system, an input end of the battery management system is respectively connected to the output end of the electric generator and the input end of the voltage converter, a control end of the battery management system is connected to a controlled end of the voltage converter, the battery management system is configured to execute steps of the charging control method according to any one of the embodiments in the first aspect.

According to a third aspect, the present disclosure provides a computer-readable storage medium, on which a computer program is stored, when the computer program is executed by at least one processor, the computer program causes the at least one processor to: acquire a working voltage of a voltage converter on a condition that an output voltage of an electric generator is greater than a rated voltage of a battery module, the battery module comprising a lead-acid battery and a lithium battery, the rated voltage of the battery module being a sum of a rated voltage of the lead-acid battery and a rated voltage of the lithium battery, the electric generator being connected to the lithium battery, and the voltage converter being connected in series between the electric generator and the lead-acid battery; determine working parameters of the lead-acid battery according to the working voltage of the voltage converter, the working parameters of the lead-acid battery comprising a working voltage of the lead-acid battery and a working current of the lead-acid battery; and output an adjustment signal to the voltage converter according to the working parameters of the lead-acid battery, the adjustment signal being configured to instruct the voltage converter to adjust a voltage output to the lead-acid battery.

Other aspects and advantages of the disclosure will become apparent from the following detailed description, taken in conjunction with the accompanying drawings, illustrating by way of example the principles of the disclosure.

DETAILED DESCRIPTION

In order to facilitate understanding of the present disclosure, the present disclosure will be described more fully below with reference to related drawings. It should be understood that the embodiments described in the present disclosure are only used to explain the present disclosure, but not to limit the present disclosure.

Figure 1:
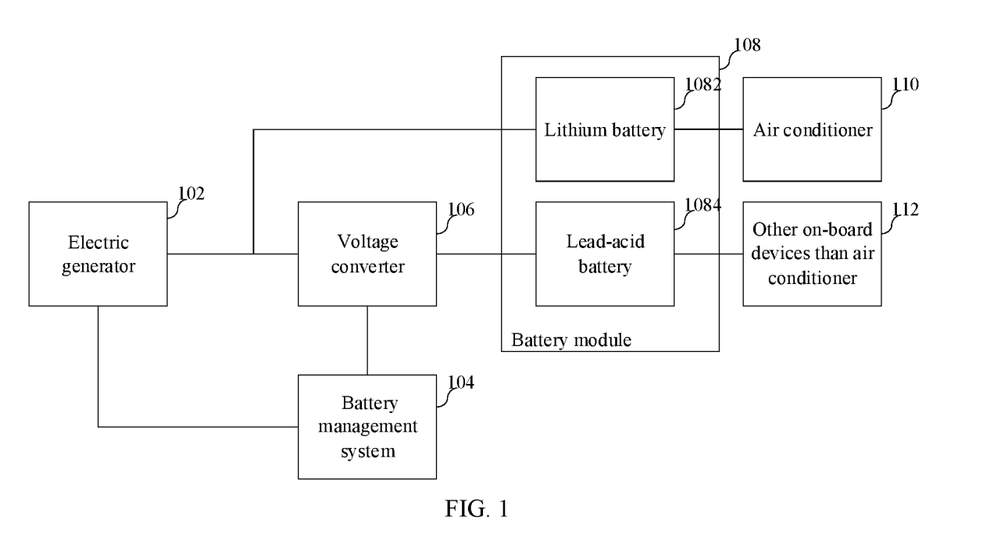
FIG. 1 is a schematic diagram showing an application environment of a charging control method according to an embodiment.

A charging control method provided in the embodiments of the present disclosure may be applied to an environment shown in FIG. 1. A battery management system 104 is connected to an electric generator 102 and a voltage converter 106, respectively. The voltage converter 106 is connected in series between a lead-acid battery 1084 of a battery module 108 and the electric generator 102. The electric generator 102 is also connected to a lithium battery 1082 of the battery module 108. The battery management system 104 obtains a working voltage of the voltage converter 106 when an output voltage of the electric generator 102 is greater than a rated voltage of the battery module 108. The rated voltage of the battery module 108 is a sum of a rated voltage of the lead-acid battery 1084 and a rated voltage of the lithium battery 1082. The battery management system 104 determines working parameters of the lead-acid battery 1084 according to the working voltage of the voltage converter 106. The battery management system 104 outputs adjustment signals to the voltage converter 106 according to the working parameters of the lead-acid battery 1084. The adjustment signals include a first adjustment signal and a second adjustment signal, and the voltage converter 106 adjusts the voltage output to the lead-acid battery 1084 according to the adjustment signals. The lithium battery 1082 is also connected to an on-board air conditioner 110 specifically to supply power to the on-board air conditioner 110. The lead-acid battery 1084 also supplies power to other on-board devices 112 than the on-board air conditioner 110. The on-board devices include but is not limited to lights, on-board central control system, on-board audio equipment and the like.

Figure 2:
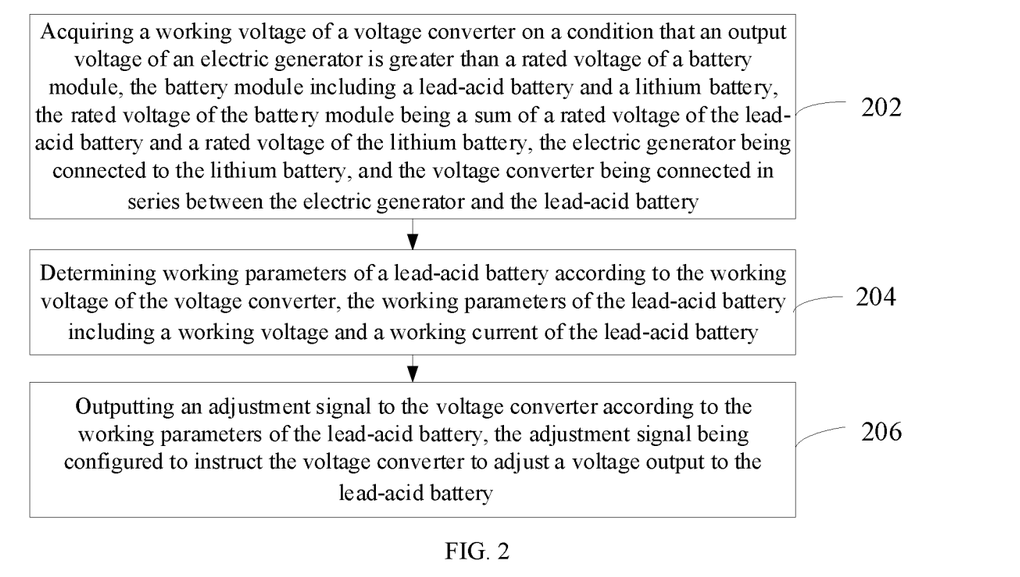
FIG. 2 is a schematic flowchart of a charging control method according to an embodiment.

In an embodiment, as shown in FIG. 2, a charging control method is provided. Taking the charging control method applied to the battery management system 104 shown in FIG. 1 as an example, the charging control method includes the following steps.

At step 202, the working voltage of the voltage converter 106 is acquired on a condition that the output voltage of the electric generator 102 is greater than the rated voltage of the battery module 108. The battery module 108 includes the lead-acid battery 1084 and the lithium battery 1082, and the rated voltage of the battery module 108 refers to the sum of the rated voltage of the lead-acid battery 1084 and the rated voltage of the lithium battery 1082. The electric generator 102 is connected to the lithium battery 1082, and the voltage converter 106 is connected in series between the electric generator 102 and the lead-acid battery 1084.

The output voltage of the electric generator 102 refers to a voltage at an output end of the electric generator 102 when a rotor of the electric generator 102 is driven by rotation of an engine to cut magnetic field lines of a magnetic field generated by a stator of the electric generator 102 after the engine of a vehicle is started. The rated voltage of the lead-acid battery 1084 refers to an optimal voltage of the lead-acid battery 1084 when the lead-acid battery 1084 works normally for a long time, i.e., a nominal voltage of the lead-acid battery 1084. In an embodiment, the rated voltage of the lead-acid battery 1084 may be 12V, 24V, 36V, or 48V, etc., which may be selected according to actual requirements. Similarly, the rated voltage of the lithium battery 1082 refers to an optimum voltage of the lithium battery 1082 when the lithium battery 1082 works normally for a long time, i.e., a nominal voltage of the lithium battery 1082.

For example, in a specific embodiment, the rated voltage of the lithium battery 1082 may be 12V, 24V, 36V, 48V, etc. Furthermore, in order to store more electrical energy output by the electric generator 102 as quickly as possible and to have better compatibility in terms of size, the lithium battery 1082 may be a lithium iron phosphate battery with a rated voltage of 48V and a battery capacity of 280 AH. The voltage converter 106 may be a DC/DC converter. For example, in an embodiment, the DC/DC converter may be a 12 VDC/48 VDC buck-boost converter. The working voltage of the voltage converter 106 may be an output voltage of the voltage converter 106, and the output voltage of the voltage converter 106 refers to an output voltage after the voltage input by the electric generator 102 to the voltage converter 106 is stepped down or boosted by the voltage converter 106.

In detail, the battery management system 104 obtains the output voltage of the electric generator 102 by a device such as a voltage sensor, compares the obtained output voltage of the electric generator 102 with the rated voltage of the battery module 108, and obtains the working voltage of the voltage converter 106 through a device such as a voltage sensor on a condition that the output voltage of the electric generator 102 is greater than the rated voltage of the battery module 108, that is, on a condition that the output voltage of the electric generator 102 meets charging conditions of the lead-acid battery 1084 and the lithium battery 1082. In general, the lead-acid battery 1084 and the lithium battery 1082 each have a rated voltage under a corresponding specific model, and the rated voltage has a specific and determined value. In an embodiment, the rated voltage of the lead-acid battery 1084 and the rated voltage of the lithium battery 1082 may be stored in the battery management system 104 as specific parameters. The above-mentioned voltage sensor may be arranged inside the battery management system 104 or connected in series between two modules that transmit voltage data to each other. The configuration of the voltage sensor may be adjusted according to actual circuits.

At step 204, the working parameters of the lead-acid battery 1084 are determined according to the working voltage of the voltage converter 106. The working parameters of the lead-acid battery 1084 may include the working voltage of the lead-acid battery 1084 and a working current of the lead-acid battery 1084. The voltage converter 106 is connected in series between the electric generator 102 and the lead-acid battery 1084, and based on this electrical connection relationship, the working parameters of the lead-acid battery 1084 may be determined by obtaining the working voltage of the voltage converter 106.

The working voltage and the working current of the lead-acid battery 1084 refer to the output voltage and the output current of an output end of the lead-acid battery 1084 (i.e., a positive end and a negative end of the lead-acid battery 1084), respectively, when a load is connected to the lead-acid battery 1084. In detail, the output voltage and the output current of the lead-acid battery 1084 vary respectively, depending on the type and the resistance of the connected load. For example, when the resistance of the load connected to the lead-acid battery 1084 increases, the output voltage and the output current of the lead-acid battery 1084 increase. When the resistance of the load connected to the lead-acid battery 1084 decreases, the output voltage and the output current of the lead-acid battery 1084 decrease. In other words, the working parameters of the corresponding lead-acid battery 1084 are different when the load with different resistance values is connected to the lead-acid battery 1084.

In detail, the working parameters (the working voltage and the working current) of the lead-acid battery 1084 are different based on different scenarios in which the loads with different resistances are connected to the lead-acid battery 1084. In order to meet the requirements of different working parameters of the lead-acid battery 1084, the voltage converter 106 connected in series between the electric generator 102 and the lead-acid battery 1084 requires different working voltages, that is, the working parameters of the lead-acid battery 1084 and the working voltage of the voltage converter 106 have a certain mapping relationship, and the working parameters of the lead-acid battery 1084 may be determined according to the working voltage of the voltage converter 106 based on the mapping relationship. The mapping relationship may be a simple linear relationship. In an embodiment, the working parameters of the lead-acid battery 1084 increase when the working voltage of the voltage converter 106 increases, and the working parameters of the lead-acid battery 1084 decrease when the working voltage of the voltage converter 106 decreases.

At step 206, an adjustment signal is output to the voltage converter 106 according to the working parameters of the lead-acid battery 1084. The adjustment signal is configured to instruct the voltage converter 106 to adjust the voltage output to the lead-acid battery 1084. The adjustment signal includes a first adjustment signal and a second adjustment signal.

In detail, the battery management system 104 outputs the first adjustment signal or the second adjustment signal to instruct the voltage converter 106 to adjust the voltage output by the electric generator 102 to the lead-acid battery 1084 according to the determined working parameters of the lead-acid battery 1084, that is, according to the change (including increase or decrease) of the working voltage and the working current of the lead-acid battery 1084. Based on the law of energy conservation, on a condition that the output power of the electric generator 102 is constant, the greater the electrical energy obtained by the lead-acid battery 1084, the less the charging electrical energy obtained by the lithium battery 1082 is, and conversely, the less the electric energy obtained by the lead-acid battery 1084, the greater the charging electric energy obtained by the lithium battery 1082 is.

In this embodiment, the battery management system 104 obtains the working voltage of the voltage converter 106 on a condition that the output voltage of the electric generator 102 is greater than the rated voltage of the battery module 108, in other words, on a condition that the output voltage of the electric generator 102 meets the charging conditions of the lead-acid battery 1084 and the lithium battery 1082. Then, the working parameters of the lead-acid battery 1084 are determined according to the mapping relationship between the working voltage of the voltage converter 106 and the working parameters of the lead-acid battery 1084. The adjustment signal is output according to the working parameters of the lead-acid battery 1084 to enable the voltage converter 106 to adjust the voltage output by the electric generator 102 to the lead-acid battery 1084 in real time. In the above charging control method, by means of the voltage converter 106 connected in series between the electric generator 102 and the lead-acid battery 1084, the battery management system 104 adjusts the voltage output by the electric generator 102 to the lead-acid battery 1084 according to the real-time working state of the lead-acid battery 1084, that is, the electric energy output from the electric generator 102 to the lead-acid battery 1084 is adjusted in real time, and therefore, the electric energy output from the electric generator 102 to the lead-acid battery 1084 and the lithium battery 1082 is rationally distributed, so as to improve energy utilization.

Figure 3:
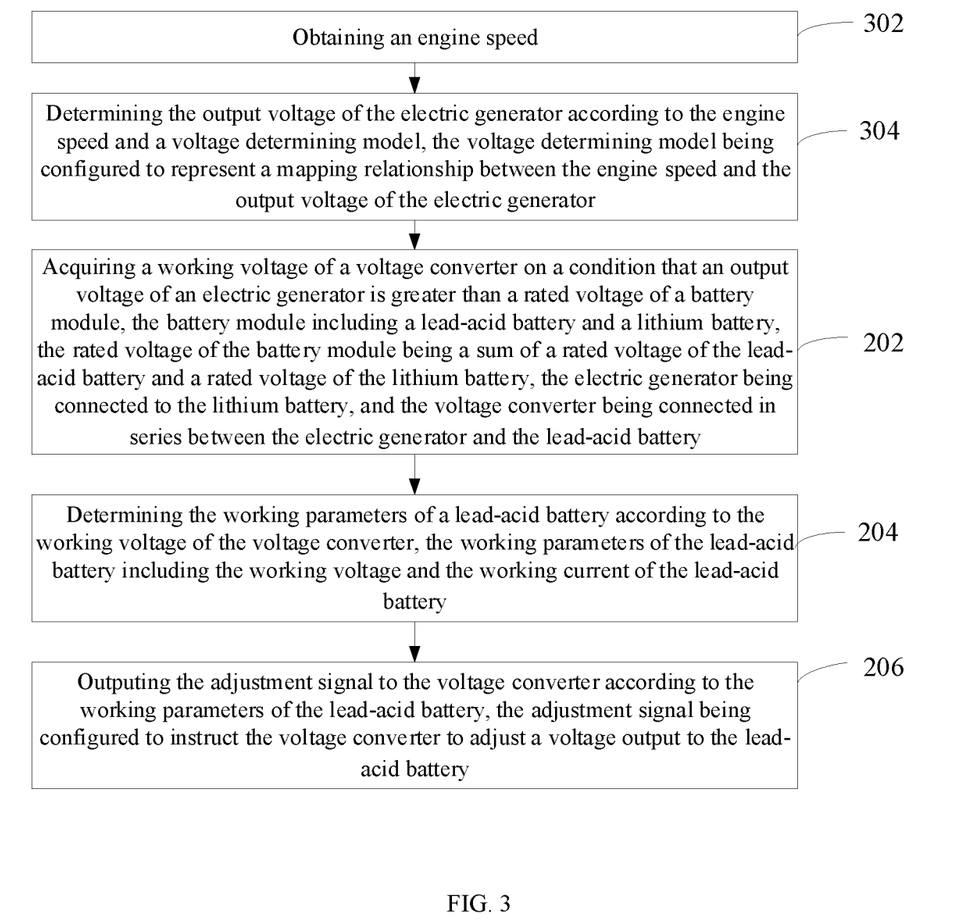
FIG. 3 is a schematic flowchart of a charging control method according to another embodiment.

In an embodiment, as shown in FIG. 3, before acquiring the working voltage of the voltage converter on a condition that the output voltage of the electric generator is greater than the rated voltage of the battery module, the method further includes the following steps 302 and 304.

At step 302, an engine speed is obtained.

The engine speed is a specific physical parameter, and the level of the engine speed is related to the times of the work per unit time or the effective power of the engine, that is, the effective power of the engine varies with the engine speed. In an embodiment, the engine may be the engine of a vehicle.

In detail, the engine speed may be obtained by a speed sensor, and the speed sensor is connected to signal teeth on a flywheel of the engine. The speed sensor is a sensor that converts a rotational speed of a rotating object into electrical signal and outputs the electrical signal.

At step 304, the output voltage of the electric generator 102 is determined according to the engine speed and a voltage determining model. The voltage determining model is configured to represent a mapping relationship between the engine speed and the output voltage of the electric generator 102.

The mapping relationship between the engine speed and the output voltage of the electric generator 102 may be a linear relationship. For example, in an embodiment, under a constant intensity of the magnetic field generated by the stator of the electric generator 102, the higher the rotation speed of the rotor of the electric generator 102, the higher the output voltage of the electric generator 102 is, and the lower the rotation speed of the rotor of the electric generator 102, the lower the output voltage of the electric generator 102 is. In detail, different types of electric generators 102 each have an output voltage for a corresponding engine speed. The engine speed and the output voltage are determined by the model of the electric generator 102, which will not be repeated here. In an embodiment, when the vehicle is started, the lithium battery 1082 supplies power to the stator of the electric generator 102 to generate the magnetic field required by the electric generator 102 to generate electricity. In an embodiment, an auxiliary power supply is arranged inside the lithium battery 1082, the auxiliary power supply outputs an enable signal when the vehicle starts. The enable signal is configured to enable the lithium battery 1082 to supply power to the stator of the electric generator 102 to generate the magnetic field required by the electric generator 102 to generate electricity. The auxiliary power supply is also configured to start the electric generator 102.

In this embodiment, the battery management system 104 obtains the engine speed by using the speed sensor connected to the engine, and determines the output voltage of the electric generator 102 in combination with a voltage determining model (i.e., a mapping relationship configured to represent the relationship between the engine speed and the output voltage of the electric generator 102), such that the output voltage of the electric generator 102 can be obtained more accurately and quickly.

Figure 4:
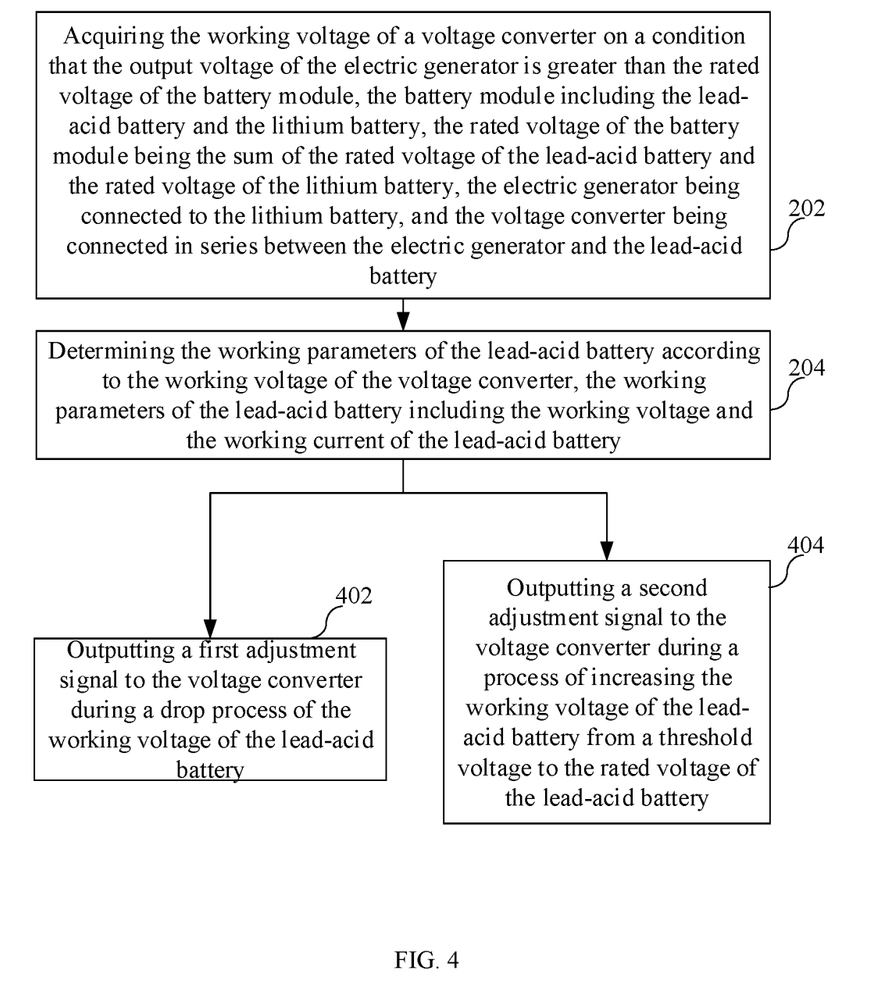
FIG. 4 is a schematic flowchart of a charging control method according to another embodiment.

In an embodiment, as shown in FIG. 4, the step 206 of outputting the adjustment signal to the voltage converter 106 according to the working parameters of the lead-acid battery 1084 further includes the following step 402.

At step 402, the first adjustment signal is output to the voltage converter 106 during a drop process of the working voltage of the lead-acid battery 1084. The first adjustment signal is configured to instruct the voltage converter 106 to increase the voltage output to the lead-acid battery 1084 to maintain the working voltage of the lead-acid battery 1084 at the rated voltage of lead-acid battery 1084.

The working voltage of the lead-acid battery 1084 refers to the output voltage of the lead-acid battery 1084 after the load is connected. In detail, the output voltage of the lead-acid battery 1084 is slightly lower than the rated voltage of the lead-acid battery 1084. For example, the rated voltage of the lead-acid battery 1084 is 12V, and the working voltage of the lead-acid battery 1084 after the load is connected is 11.5V.

The drop process of the working voltage of the lead-acid battery 1084 refers to a change process in which the working voltage at a previous moment is greater than the working voltage at a next moment. It may be a process in which the resistance of the load connected to the lead-acid battery 1084 is increased, and in which the output voltage of the lead-acid battery 1084 after the load connected to the lead-acid battery 1084 is increased is lower than the output voltage of the lead-acid battery 1084 before the load is increased. For example, the output voltage of the lead-acid battery 1084 is 11.5V before the connected load is increased, and the working voltage of the lead-acid battery 1084 is reduced to 11.3V after the connected load is increased. The rated voltage and the working voltage of the lead-acid battery 1084 may be adjusted according to actual needs, which are not limited here.

In detail, on a condition that the battery management system 104 detects that the working voltage of the lead-acid battery 1084 drops, in order to ensure that the load connected to the lead-acid battery 1084 works normally and the power of the lead-acid battery 1084 is always in a saturated state, the first adjustment signal is output to instruct the voltage converter 106 to increases the voltage output by the electric generator 102 to the lead-acid battery 1084, so that the working voltage of the lead-acid battery 1084 is stabilized at the rated voltage of the lead-acid battery 1084 and charges the lead-acid battery 1084.

In an embodiment, as shown in FIG. 4, the step 206 of outputting an adjustment signal to the voltage converter 106 according to the working parameters of the lead-acid battery 1084 further includes the following step 404.

At step 404, the second adjustment signal is output to the voltage converter 106 during a process of increasing the working voltage of the lead-acid battery 1084 from a threshold voltage to the rated voltage of the lead-acid battery 1084, the second adjustment signal is configured to instruct the voltage converter 106 to reduce the voltage output to the lead-acid battery 1084.

The threshold voltage refers to a voltage value that is less than the rated voltage and suppresses overcharging. For example, on a condition that the rated voltage is 12V, if the working voltage of the lead-acid battery 1084 reaches 11.8V, and the lead-acid battery 1084 is still charged at a higher charging voltage, the lead-acid battery 1084 may be overcharged. At this time, the voltage output from the voltage converter 106 to the lead-acid battery 1084 is reduced to prevent overcharging. Those skilled in the art can understand the threshold voltage is the voltage of 11.8V in this example. It should be noted that for different types of lead-acid batteries 1084, the threshold voltage may also be set to other values based on tests, as long as the lead-acid battery 1084 can be prevented from being overcharged during the charging process.

In detail, the lead-acid battery 1084 will supply power to the load with a working voltage slightly lower than the rated voltage after the load is connected to the lead-acid battery 1084. If the number of the loads connected to the lead-acid battery 1084 increases, the working voltage of the lead-acid battery 1084 will decrease. At this moment, the battery management system 104 detects that the working voltage of the lead-acid battery 1084 is decreasing, and outputs the first adjustment signal to the voltage converter 106. The voltage converter 106 increases the voltage output by the electric generator 102 to the lead-acid battery 1084 in response to the first adjustment signal. The working voltage of the lead-acid battery 1084 will continue to increase after increasing to the threshold voltage until it is stabilized at the rated voltage of the lead-acid battery 1084. After the working voltage of the lead-acid battery 1084 is increased to the threshold voltage, the voltage converter 106 still increases the voltage input to the lead-acid battery 1084 with the power controlled by the first adjustment signal, which may cause overcharge and lead to an accident, and reduce energy utilization. In response to the above problem, by setting the threshold voltage, the voltage output by the electric generator 102 to the lead-acid battery 1084 is reduced when the working voltage of the lead-acid battery 1084 increases to the threshold voltage, so that the electric energy can be distributed to the lithium battery 1082 as much as possible, and the problems of overcharge of lead-acid battery 1084 and energy waste are avoided.

In an embodiment, the rated voltage of the lead-acid battery 1084 is 12V, and the working voltage of the lead-acid battery 1084 after being connected to the load at a certain moment is 11.5V. At this time, the voltage converter 106 will increase the voltage output by the electric generator 102 to the lead-acid battery 1084. After the working voltage of the lead-acid battery 1084 increases to the threshold voltage of 11.8V, the voltage converter 106 still increases the voltage output by the electric generator 102 to the lead-acid battery 1084. For energy utilization reasons, the battery management system 104 outputs the second adjustment signal, and the voltage converter 106 reduces the voltage input to the lead-acid battery 1084 in response to the second adjustment signal, so that the electric energy is distributed to the lithium battery 1082 as much as possible, thereby avoiding overcharge of the lead-acid battery 1084 and energy waste.

Figure 5:
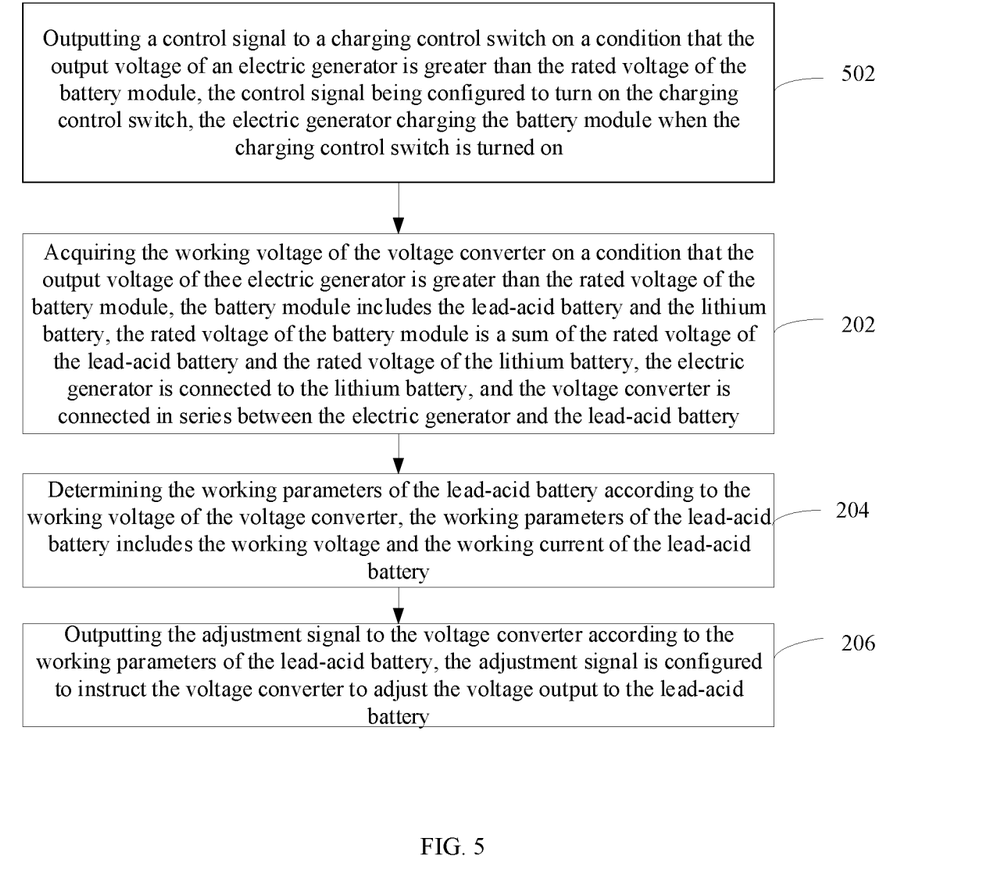
FIG. 5 is a schematic flowchart of a charging control method according to another embodiment.

In an embodiment, as shown in FIG. 5, on a condition that the output voltage of the electric generator 102 is greater than the rated voltage of the battery module 108, before the step 202 in which the working voltage of the voltage converter 106 is acquired, the method further includes the following step 502.

At step 502, a control signal is output to a charging control switch 114 on the condition that the output voltage of the electric generator 102 is greater than the rated voltage of the battery module 108. The control signal is configured to turn on the charging control switch 114. The charge control switch 114 is connected in series to a common power supply branch by which the electric generator 102 supplies power to both the lithium battery 1082 and the voltage converter 106. Based on this connection, the electric generator 102 charges the battery module 108 when the charging control switch 114 is turned on.

The charging control switch 114 is connected in series between the electric generator 102 and the voltage converter

106 and configured to control the electric generator 102 to charge the battery module 108.

In detail, the electric generator 102 continues to generate electricity after the engine is started. In order to charge the battery module 108 at an appropriate charging voltage, the charging control switch 114 is turned off on a condition that the battery management system 104 determines that the output voltage of the electric generator 102 is lower than the rated voltage of the battery module 108. The battery management system 104 outputs the control signal to and turn on the charging control switch 114 on the condition that the output voltage of the electric generator 102 is greater than the rated voltage of the battery module 108, and thus the electric generator 102 charges the battery module 108. By the above control, the battery module 108 is prevented from being charged at an inappropriate charging voltage, and the life of the battery module 108 is guaranteed.

Figure 8:
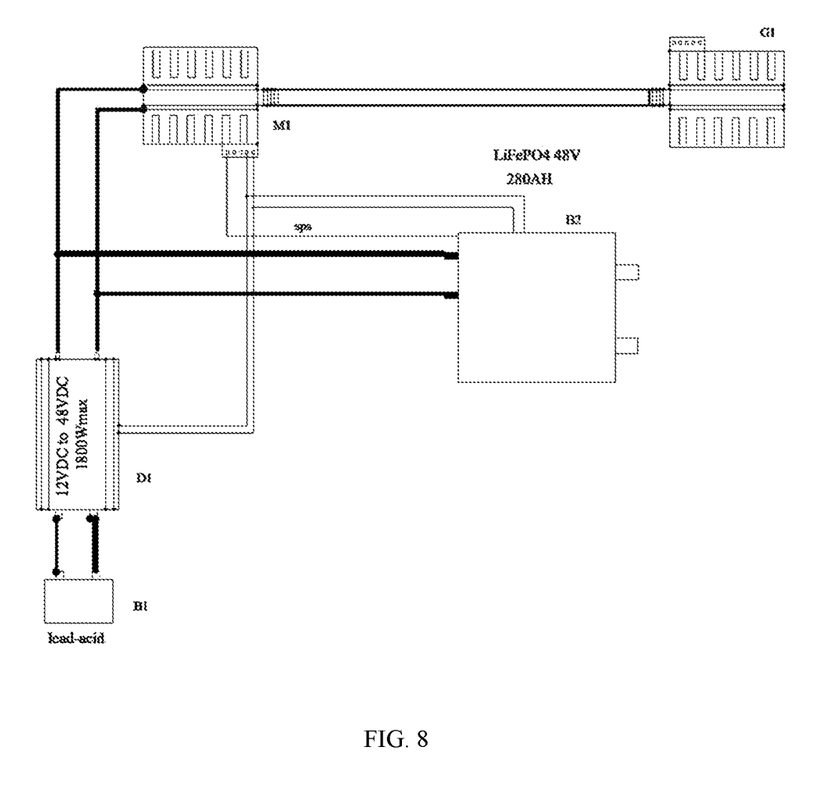
FIG. 8 is a schematic diagram showing a structure of an on-board charging control module according to an embodiment.

In order to further explain the present disclosure, the following description will be given in conjunction with an example of an on-board charging module. In this example, as shown in FIG. 8, the on-board charging module includes an electric generator M1, a lithium battery B2, a lead-acid battery B1 and a voltage converter D1. The electric generator M1 is configured to connect to an external engine G1, and is driven by a belt of the engine G1 to generate electricity. A built-in battery management system and an auxiliary power supply are arranged in the lithium battery B2, and the connection relationship thereof is shown in FIG. 8. The specific implementation can be known by those skilled in the art from the figure, which is not repeated here.

In detail, after the vehicle is started, the auxiliary power supply built in the lithium battery B2 outputs an enable signal to a lithium battery cell. The enable signal is configured to start the lithium battery cell. The auxiliary power supply is further configured to supply power to the electric generator M1 to start the electric generator M1. The lithium battery cell supplies power to the stator of the electric generator M1 to generate a magnetic field for electricity generation after starting. The rotor of the electric generator M1, driven by the belt of the engine G1, cuts the magnetic field generated by the stator to generate electricity. The battery management system obtains the engine speed of the engine G1, determines the output voltage of the electric generator M1 according to the engine speed and the voltage determining model, and obtains the rated voltage of the lithium battery B2 and rated voltage of the lead-acid battery B1. The electric generator M1 charges the lithium battery B2 and the lead-acid battery B1 on a condition that the output voltage of the electric generator M1 is greater than the sum of the rated voltage of the lithium battery B2 and rated voltage of the lead-acid battery B1, and the working voltage of the voltage converter D1 is obtained by the battery management system. The battery management system determines the working parameters of the lead-acid battery according to the working voltage of the voltage converter D1, and adjusts the voltage output by the electric generator to the lead-acid battery according to the determined working parameters of the lead-acid battery. If the working voltage of the lead-acid battery decreases, the voltage output by the electric generator to the lead-acid battery is increased, so that the working voltage of the lead-acid battery is stabilized at the rated voltage of the lead-acid battery and the lead-acid battery is charged. If the working voltage of the lead-acid battery increases, the voltage output by the electric generator to the lead-acid battery is reduced to avoid overcharge of the lead-acid battery, so that the electric energy is distributed to the lithium battery as much as possible to improve the energy utilization. By the above charging control method, rational energy distribution of the electric generator is ensured, and the energy utilization rate is improved.

It should be understood that, although the steps in the flowcharts involved in the above embodiments are sequentially shown by the indications of the arrows, these steps are not necessarily executed in the order indicated by the arrows. Unless explicitly stated herein, the execution of these steps is not strictly limited to the order, and these steps may be performed in other orders. Moreover, at least a part of the steps in the flowcharts involved in the above embodiments may include multiple steps or multiple stages, and these steps or stages are not necessarily executed and completed at the same time, but may be performed at different times. The execution order of these steps or phases is not necessarily sequential, but may be performed alternately or in turn with other steps or at least a part of the steps or stages of the other steps.

Based on the same concept, the embodiments of the present disclosure further provide a charging control system and a charging control device for implementing the above-mentioned charging control method. The solution to the problem provided by the charging control system is similar to the solution described in the above charging control method, so the specific descriptions of embodiments of one or more charging control systems and charging control devices provided below can be derived with reference to the above description for the charging control method, which will not be repeated here.

Figure 6:
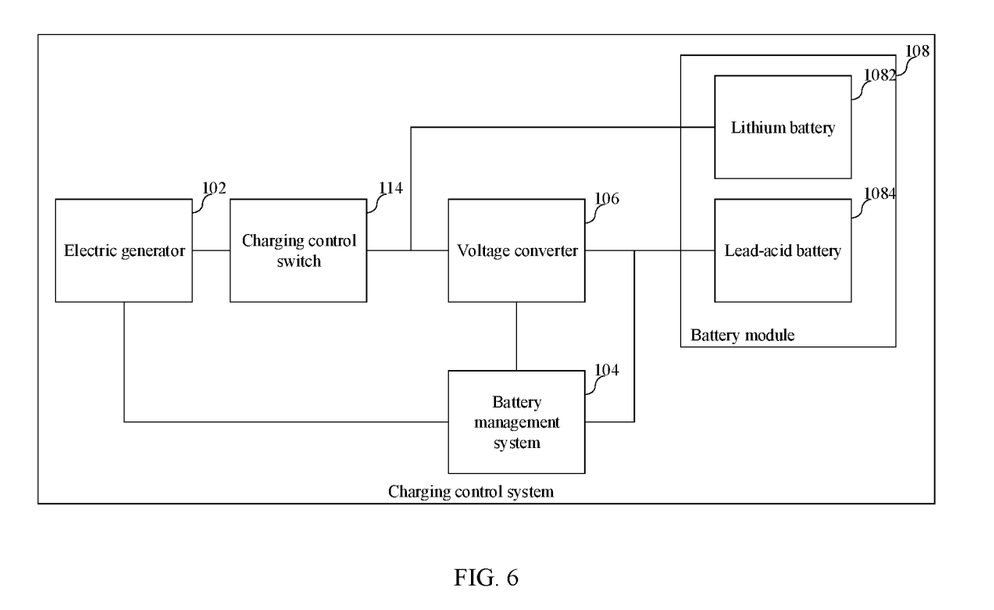
FIG. 6 is a schematic diagram showing a structure of a charging control system according to an embodiment.

In an embodiment, as shown in FIG. 6, a charging control system is provided. The charging control system includes an electric generator, a voltage converter, a lead-acid battery, a lithium battery and a battery management system. The electric generator is configured to connect to an external engine and generate electricity driven by the external engine. An input end of the voltage converter is connected to an output end of the electric generator. An input end of the lead-acid battery is connected to an output end of the voltage converter, an input end of the lithium battery is connected to the output end of the electric generator, and an input end of the battery management system is respectively connected to the output end of the electric generator and the input end of the voltage converter. A control end of the battery management system is connected to a controlled end of the voltage converter. The battery management system is configured to execute the steps of any embodiment of the above charging control method.

Figure 7:
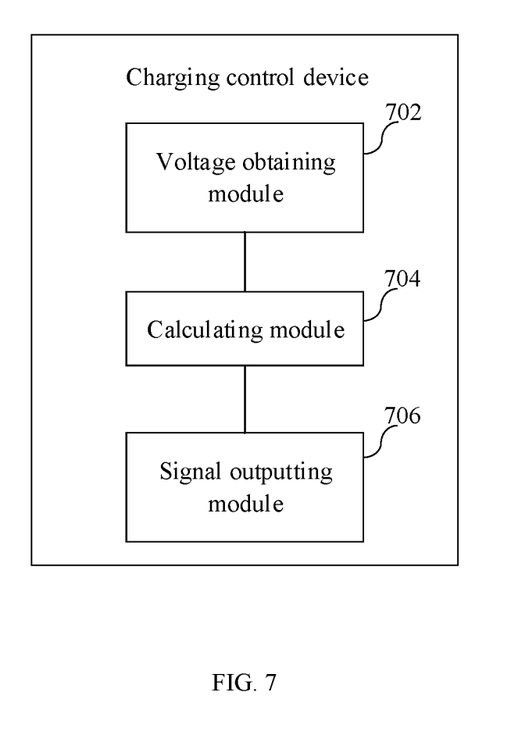
FIG. 7 is a block diagram showing a structure of a charging control device according to an embodiment.

In an embodiment, as shown in FIG. 7, a charging control device is provided. The charging control device includes a voltage obtaining module 702, a calculating module 704, and a signal outputting module 706.

The voltage obtaining module 702 is configured to obtain the working voltage of the voltage converter on a condition that the output voltage of the electric generator is greater than the rated voltage of the battery module. The battery module includes the lead-acid battery and the lithium battery, and the rated voltage of the battery module is the sum of the rated voltage of the lead-acid battery and the rated voltage of the lithium battery. The electric generator is connected to the lithium battery, and the voltage converter is connected in series between the electric generator and the lead-acid battery.

The calculating module 704 is configured to determine the working parameters of the lead-acid battery according to the working voltage of the voltage converter, the working parameters of the lead-acid battery include the working voltage of the lead-acid battery and the working current of the lead-acid battery.

The signal outputting module 706 is configured to output the adjustment signal to the voltage converter according to the working parameters of the lead-acid battery. The adjustment signal is configured to instruct the voltage converter to adjust the voltage output to the lead-acid battery.

In an embodiment, the voltage obtaining module 702 further includes: a speed obtaining unit configured to obtain the engine speed; an output voltage determining unit configured to determine the output voltage of the electric generator according to the engine speed and the voltage determining model, the voltage determining model is configured to represent the mapping relationship between the engine speed and the output voltage of the electric generator.

In an embodiment, the signal outputting module 706 includes: a first adjustment signal generating unit configured to output the first adjustment signal to the voltage converter during the drop process of the working voltage of the lead-acid battery. The first adjustment signal is configured to instruct the voltage converter to increase the voltage output to the lead-acid battery to maintain the working voltage of the lead-acid battery at the rated voltage of the lead-acid battery.

In an embodiment, the signal outputting module 706 further includes: a charging starting unit configured to output the control signal to the charging control switch on the condition that the output voltage of the electric generator is greater than the rated voltage of the battery module. The control signal is configured to turn on the charging control switch. The charging control switch is connected in series to the power supply branch of the electric generator to the lithium battery and the voltage converter.

The modules in the above charging control device can be implemented in whole or in part by software, hardware and combinations thereof. The above modules can be embedded in or independent of a processor in a computer device in a form of hardware, or stored in a memory in the computer device in a form of software, so that the processor can call and execute the operations corresponding to the above modules.

In an embodiment, an on-board charging module is provided. The on-board charging module includes a storage and a processor, a program is stored in the storage, and when the program is executed by the processor, the processor performs the steps of the charging control method described in any of the foregoing embodiments.

In an embodiment, a computer-readable storage medium is further provided. A computer program is stored in the computer-readable storage medium, and when the computer program is executed by at least one processor, the computer program causes the at least one processor to perform the charging control method according to any of the embodiments described above.

In an embodiment, the present disclosure further provides a computer program product. When the computer program is executed by a processor, the steps of any one of the charging control methods described above are performed.

The beneficial effects of the charging control method, system, device, on-board charging module and storage medium according to various embodiments of the present disclose at least include: the total rated voltage of the battery module is compared with the output voltage of electric generator, and the battery module is charged only when the output voltage of the electric generator is greater than the total rated voltage of the battery module to ensure the charging efficiency and the charging safety of the battery module. Besides, the output voltage of the voltage converter connected between the lead-acid battery and the electric generator is monitored, the working voltage of the lead-acid battery is determined according to the output voltage of the voltage converter and the rated voltage of the lead-acid battery, and a ratio of the output voltage of the electric generator to the lead-acid battery and the lithium battery is adjusted by the voltage converter according to the working voltage of the lead-acid battery, such that the electrical energy output by the electric generator is fully stored in the battery module.

Those of ordinary skill in the art can understand that all or part of the processes of the methods of the above embodiments may be implemented by instructing relevant hardware through a computer program, and the computer program may be stored in a non-transitory computer-readable storage medium, when the computer program is executed, it can implement the processes of the above-mentioned method embodiments. Any reference to a memory, a database or other media used in the embodiments provided in the present disclosure may include at least one of a non-transitory memory and a volatile memory. The non-transitory memory may include a Read-Only Memory (ROM), a magnetic tape, a floppy disk, a flash memory, an optical memory, a high-density embedded non-transitory memory, a resistive memory (ReRAM), a Magnetoresistive Random Access Memory (MRAM), a Ferroelectric Random Access Memory (FRAM), a Phase Change Memory (PCM), or a graphene memory, etc. The volatile memory may include a Random Access Memory (RAM) or an external cache memory, and the like. By way of illustration and not limitation, the RAM may be in various forms, such as a Static Random Access Memory (SRAM) or a Dynamic Random Access Memory (DRAM). The database involved in the embodiments provided in the present disclosure may include at least one of a relational database or a non-relational database. The non-relational database may include a blockchain-based distributed database, etc., but is not limited thereto. The processors involved in the embodiments provided in present disclosure may be general-purpose processors, central processing units, graphics processors, digital signal processors, programmable logic devices, data processing logic devices based on quantum computing, etc., and is not limited to this.

The above embodiments of the technical features may be carried out in any combination, in order to make the description concise, not all possible combinations of the technical features of the above embodiments are described. However, as long as the combination of these technical features do not contradict, these technical features should be considered to be within the scope of the description of this specification.

The above-mentioned embodiments only illustrate several embodiments of the present disclosure, and the descriptions thereof are relatively specific and detailed, but should not be construed as a limitation on the scope of the patent of the present disclosure. It should be noted that for those skilled in the art, without departing from the concept of the present disclosure, several modifications and improvements may be made, which all fall within the protection scope of the present disclosure. Therefore, the scope of protection of the present disclosure shall be subject to the appended claims.

What is claimed is:

1. A charging control method, comprising:
acquiring a working voltage of a voltage converter on a condition that an output voltage of an electric generator is greater than a rated voltage of a battery module, the battery module comprising a lead-acid battery and a lithium battery, the rated voltage of the battery module being a sum of a rated voltage of the lead-acid battery and a rated voltage of the lithium battery, the electric generator being connected to the lithium battery, and the voltage converter being connected in series between the electric generator and the lead-acid battery;

determining working parameters of the lead-acid battery according to the working voltage of the voltage converter, the working parameters of the lead-acid battery comprising a working voltage of the lead-acid battery and a working current of the lead-acid battery; and outputting an adjustment signal to the voltage converter according to the working parameters of the lead-acid battery, the adjustment signal being configured to instruct the voltage converter to adjust a voltage output to the lead-acid battery.

2. The charging control method according to claim 1, before acquiring the working voltage of the voltage converter on a condition that the output voltage of the electric generator is greater than the rated voltage of the battery module, further comprising:

obtaining an engine speed; and determining the output voltage of the electric generator according to the engine speed and a voltage determining model representing a mapping relationship between the engine speed and the output voltage of the electric generator.

3. The charging control method according to claim 1, wherein the adjustment signal comprises a first adjustment signal, and the outputting the adjustment signal to the voltage converter according to the working parameters of the lead-acid battery comprises:

outputting the first adjustment signal to the voltage converter during a drop process of the working voltage of the lead-acid battery, the first adjustment signal being configured to instruct the voltage converter to increase the voltage output to the lead-acid battery to maintain the working voltage of the lead-acid battery at the rated voltage of lead-acid battery.

4. The charging control method according to claim 1, wherein the adjustment signal comprises a second adjustment signal, and the outputting the adjustment signal to the voltage converter according to the working parameters of the lead-acid battery comprises:

outputting the second adjustment signal to the voltage converter during a process of increasing the working voltage of the lead-acid battery from a threshold voltage to the rated voltage of the lead-acid battery, the second adjustment signal being configured to instruct the voltage converter to reduce the voltage output to the lead-acid battery.

5. The charging control method according to claim 1, wherein before the acquiring the working voltage of the voltage converter on the condition that the output voltage of the electric generator is greater than the rated voltage of the battery module, the method further comprises:

outputting a control signal to a charging control switch on the condition that the output voltage of the electric generator is greater than the rated voltage of the battery module, wherein the control signal is configured to turn on the charging control switch, and the charging control switch is connected in series to a common power supply branch by which the electric generator supplies power to both the lithium battery and the voltage converter.

6. A charging control system, comprising:

an electric generator configured to connect to an external engine and be driven by the external engine to generate power;

a voltage converter, an input end of the voltage converter being connected to an output end of the electric generator;

a lead-acid battery, an input end of the lead-acid battery being connected to an output end of the voltage converter;

a lithium battery, an input end of the lithium battery being connected to the output end of the electric generator; and a battery management system, an input end of the battery management system being connected to the output end of the electric generator and the input end of the voltage converter, a control end of the battery management system being connected to a controlled end of the voltage converter, wherein the battery management system is configured to:

acquire a working voltage of the voltage converter on a condition that an output voltage of the electric generator is greater than a rated voltage of a battery module, the battery module comprising the lead-acid battery and the lithium battery, the rated voltage of the battery module being a sum of a rated voltage of the lead-acid battery and a rated voltage of the lithium battery, the electric generator being connected to the lithium battery, and the voltage converter being connected in series between the electric generator and the lead-acid battery;

determine working parameters of the lead-acid battery according to the working voltage of the voltage converter, the working parameters of the lead-acid battery comprising a working voltage of the lead-acid battery and a working current of the lead-acid battery; and output an adjustment signal to the voltage converter according to the working parameters of the lead-acid battery, the adjustment signal being configured to instruct the voltage converter to adjust a voltage output to the lead-acid battery.

7. The charging control system according to claim 6, wherein the battery management system is further configured to, before acquiring the working voltage of the voltage converter on a condition that the output voltage of the electric generator is greater than the rated voltage of the battery module:

obtain an engine speed; and determine the output voltage of the electric generator according to the engine speed and a voltage determining model representing a mapping relationship between the engine speed and the output voltage of the electric generator.

8. The charging control system according to claim 6, wherein the adjustment signal comprises a first adjustment signal, and the battery management system is configured to output the adjustment signal to the voltage converter according to the working parameters of the lead-acid battery by outputting the first adjustment signal to the voltage converter during a drop process of the working voltage of the lead-acid battery, the first adjustment signal being configured to instruct the voltage converter to increase the voltage output to the lead-acid battery to maintain the working voltage of the lead-acid battery at the rated voltage of lead-acid battery.

9. The charging control system according to claim 6, wherein the adjustment signal comprises a second adjustment signal, and the battery management system is configured to output the adjustment signal to the voltage converter according to the working parameters of the lead-acid battery by outputting the second adjustment signal to the voltage converter during a process of increasing the working voltage of the lead-acid battery from a threshold voltage to the rated voltage of the lead-acid battery, the second adjustment signal being configured to instruct the voltage converter to reduce the voltage output to the lead-acid battery.

10. The charging control system according to claim 6, wherein the battery management system is further configured to, before acquiring the working voltage of the voltage converter on the condition that the output voltage of the electric generator is greater than the rated voltage of the battery module, output a control signal to a charging control switch on the condition that the output voltage of the electric generator is greater than the rated voltage of the battery module, wherein the control signal is configured to turn on the charging control switch, and the charging control switch is connected in series to a common power supply branch by which the electric generator supplies power to both the lithium battery and the voltage converter.

11. A non-transitory computer-readable storage medium, on which a computer program is stored, wherein when executed by at least one processor, the computer program causes the at least one processor to:
acquire a working voltage of a voltage converter on a condition that an output voltage of an electric generator is greater than a rated voltage of a battery module, the battery module comprising a lead-acid battery and a lithium battery, the rated voltage of the battery module being a sum of a rated voltage of the lead-acid battery and a rated voltage of the lithium battery, the electric generator being connected to the lithium battery, and the voltage converter being connected in series between the electric generator and the lead-acid battery;
determine working parameters of the lead-acid battery according to the working voltage of the voltage converter, the working parameters of the lead-acid battery comprising a working voltage of the lead-acid battery and a working current of the lead-acid battery; and
output an adjustment signal to the voltage converter according to the working parameters of the lead-acid battery, the adjustment signal being configured to instruct the voltage converter to adjust a voltage output to the lead-acid battery.

12. The non-transitory computer-readable storage medium according to claim 11, wherein when executed by the at least one processor, the computer program further causes the at least one processor to, before acquiring the working voltage of the voltage converter on a condition that the output voltage of the electric generator is greater than the rated voltage of the battery module:
obtain an engine speed; and
determine the output voltage of the electric generator according to the engine speed and a voltage determining model representing a mapping relationship between the engine speed and the output voltage of the electric generator.

13. The non-transitory computer-readable storage medium according to claim 11, wherein the adjustment signal comprises a first adjustment signal, and the computer program, when executed by the at least one processor, further causes the at least one processor to output the adjustment signal to the voltage converter according to the working parameters of the lead-acid battery by outputting the first adjustment signal to the voltage converter during a drop process of the working voltage of the lead-acid battery, the first adjustment signal being configured to instruct the voltage converter to increase the voltage output to the lead-acid battery to maintain the working voltage of the lead-acid battery at the rated voltage of lead-acid battery.

14. The non-transitory computer-readable storage medium according to claim 11, wherein the adjustment signal comprises a second adjustment signal, and the computer program, when executed by the at least one processor, further causes the at least one processor to output the adjustment signal to the voltage converter according to the working parameters of the lead-acid battery by outputting the second adjustment signal to the voltage converter during a process of increasing the working voltage of the lead-acid battery from a threshold voltage to the rated voltage of the lead-acid battery, the second adjustment signal being configured to instruct the voltage converter to reduce the voltage output to the lead-acid battery.

15. The non-transitory computer-readable storage medium according to claim 11, wherein the computer program, when executed by the at least one processor, further causes the processor to, before acquiring the working voltage of the voltage converter on the condition that the output voltage of the electric generator is greater than the rated voltage of the battery module, output a control signal to a charging control switch on the condition that the output voltage of the electric generator is greater than the rated voltage of the battery module, wherein the control signal is configured to turn on the charging control switch, and the charging control switch is connected in series to a common power supply branch by which the electric generator supplies power to both the lithium battery and the voltage converter.

* * * * *